(12) United States Patent
Wilhelm et al.

(10) Patent No.: US 10,077,799 B2
(45) Date of Patent: Sep. 18, 2018

(54) CRANKSHAFT ASSEMBLY

(71) Applicant: REGENTS OF THE UNIVERSITY OF MINNESOTA, Minneapolis, MN (US)

(72) Inventors: Shawn Wilhelm, Minneapolis, MN (US); James D. Van de Ven, Long Lake, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 303 days.

(21) Appl. No.: 14/689,269

(22) Filed: Apr. 17, 2015

(65) Prior Publication Data
US 2015/0300402 A1    Oct. 22, 2015

Related U.S. Application Data

(60) Provisional application No. 61/982,422, filed on Apr. 22, 2014.

(51) Int. Cl.
*F16C 3/12*    (2006.01)

(52) U.S. Cl.
CPC ............ *F16C 3/12* (2013.01); *F16C 2300/14* (2013.01)

(58) Field of Classification Search
CPC ...... F16C 3/12; F16C 3/18; F16D 1/04; F16D 1/0864; Y10T 403/18; Y10T 29/49963; F01D 17/162
See application file for complete search history.

(56) References Cited

U.S. PATENT DOCUMENTS

| | | | | |
|---|---|---|---|---|
| 147,837 A | * | 2/1874 | Heginbothom | F16B 7/0426 285/419 |
| 2,218,332 A | * | 10/1940 | Fowler | F02B 75/16 123/193.1 |
| 2,237,685 A | * | 4/1941 | Neuland | F16C 3/12 74/597 |
| 3,554,589 A | * | 1/1971 | Le Roy | F16D 1/04 403/313 |
| 3,606,407 A | * | 9/1971 | Pendergast | F16D 1/04 15/179 |
| 3,917,424 A | * | 11/1975 | Zugel | F16D 1/0864 403/287 |

(Continued)

FOREIGN PATENT DOCUMENTS

GB    254751    *    3/1927    ............... F16C 3/12

OTHER PUBLICATIONS

Wilhelm, S.R., Van de Ven, J.D., "Design of a Variable Displacement Triplex Pump," International Fluid Power Exposition, Las Vegas, NV, USA (2014).

(Continued)

*Primary Examiner* — Vinh Luong
(74) *Attorney, Agent, or Firm* — Brian D. Kaul; Westman, Champlin & Koehler, P.A.

(57) ABSTRACT

A crankshaft assembly includes a crankshaft member, a crank pin shaft member and a clamp. The crankshaft member includes a first central axis and an end having a first circumferential mating surface. The crank pin shaft member includes a second central axis that is substantially parallel to the first central axis, and an end having a second circumferential mating surface. The clamp is configured to secure the first circumferential mating surface to the second circumferential mating surface.

13 Claims, 5 Drawing Sheets

(56) References Cited

U.S. PATENT DOCUMENTS

| | | | | |
|---|---|---|---|---|
| 4,072,448 | A | * | 2/1978 | Loyd, Jr. .................. F16C 3/18 123/90.17 |
| 4,168,636 | A | * | 9/1979 | Kocher ................... F16B 4/004 403/368 |
| 4,175,405 | A | * | 11/1979 | Smith ..................... F16D 1/033 403/341 |
| 4,351,201 | A | * | 9/1982 | Link ........................ F16C 3/12 403/393 |
| 4,351,278 | A | * | 9/1982 | Gaschler ................ F02B 65/00 123/195 R |
| 4,416,563 | A | * | 11/1983 | Zemke ..................... F16D 1/04 403/14 |
| 4,714,060 | A | * | 12/1987 | Kesteloot .................. F01B 1/12 123/195 R |
| 4,813,296 | A | * | 3/1989 | Guinn ..................... A01D 34/30 403/341 |
| 5,000,613 | A | * | 3/1991 | Heald ................... F04D 13/021 403/312 |
| 5,203,230 | A | | 4/1993 | Distelrath |
| 5,265,566 | A | * | 11/1993 | Arnold ................... F02F 11/007 123/197.4 |
| 5,343,777 | A | | 9/1994 | Wood et al. |
| 5,415,492 | A | * | 5/1995 | Poscich ..................... F16D 1/05 403/354 |
| 5,851,084 | A | * | 12/1998 | Nishikawa ............ F16D 1/0864 403/290 |
| 6,293,243 | B1 | | 9/2001 | Koder et al. |
| 6,314,643 | B1 | * | 11/2001 | Leith ........................ F16C 3/10 29/418 |
| 7,950,868 | B2 | | 5/2011 | Kabir et al. |
| 2012/0230758 | A1 | * | 9/2012 | Widenmeyer ......... F16D 1/0847 403/290 |
| 2014/0147196 | A1 | * | 5/2014 | Nishitani .............. F16D 1/0864 403/355 |
| 2016/0043534 | A1 | * | 2/2016 | Zhang .................... H02G 1/126 81/9.51 |
| 2017/0108032 | A1 | * | 4/2017 | Eremia ................ F01D 17/162 |

OTHER PUBLICATIONS

Love, L. et al., "Estimating the Impact (Energy, Emissions and Economics) of the US Fluid Power Industry," ORNL/TM-2011/14, 2012, Oak Ridge National Laboratory (ORNL).

McCandlish, D. et al., "The Mathematical Modelling of Hydrostatic Pumps and Motors," Proceedings of the Institution of Mechanical Engineers, vol. 198, 1984, pp. 165-174.

McCandlish, D. et al., "Steady State Losses in Hydrostatic Pumps and Motors," 1981, pp. 133-144.

Ivantysynova, M., "Innovations in Pump Design—What Are Future Directions," Proceedings of the 7th JFPS International Symposium on Fluid Power, 2008, pp. 59-64.

Wieczorek, U. et al., "Computer aided optimization of bearing and sealing gaps in hydrostatic machines—the simulation tool CASPAR," International Journal of Fluid Power, vol. 3, No. 1, 2002, pp. 7-20.

Manring, N.D., "Valve-plate design for an axial piston pump operating at low displacements," Journal of Mechanical Design, vol. 125, No. 1, 2003, pp. 200-205.

Inaguma, Y. et al., "Reduction of friction torque in vane pump by smoothing cam ring surface," Proceedings of the Institution of Mechanical Engineers, Part C: Journal of Mechanical Engineering Science, vol. 221, No. 5, 2007, pp. 527-534.

Rannow, M. et al., "Software Enabled Variable Displacement Pumps—Experimental Studies," Proceedings of ASME International Mechanical Engineering Congress and Exposition, 2006.

Tu, H. et al., "Modeling and Validation of a High Speed Rotary PWM On/Off Valve," Proceedings of ASME Dynamic Systems and Control Conference, 2009.

Wang, M. et al., "Design, Modeling, and Validation of a High-Speed Rotary Pulse-Width-Modulation On/Off Hydraulic Valve." Journal of Dynamic Systems, Measurement, and Control, vol. 134, 2012, pp. 061002-1.

Ehsan, M. et al., "Modeling of Digital-Displacement Pump-Motors and Their Application as Hydraulic Drives for Non-Uniform Loads," Journal of Dynamic Systems, Measurement, and Control, vol. 122, No. 1, 2000, pp. 210-215.

Linjama, M., "Digital Fluid Power—State of the Art," Proceedings of the 12th Scandinavian International Conference on Fluid Power, 2011, pp. 331-353.

Yigen, C., "Control of a Digital Displacement Pump," Thesis 63475416, 2012, Aalborg University.

Nakaya, M., et al. "Development of variable delivery triple reciprocating plunger pump for water jet cutting," Water Jet Technology Association, 1983, pp. 136-147.

Wilhelm, S.R. et al., "Design and Testing of an Adjustable Linkage for a Variable Displacement Pump," Journal of Mechanisms and Robotics, vol. 5, No. 4, 2013, pp. 041008-1-041008-8.

Wilhelm, S.R. et al., "Efficiency Modeling and Experimental Validation of a Variable Displacement Linkage Pump," ASME/BATH Symposium on Fluid Power and Motion Control, ASME, 2013.

Deb, K. et al., "A Fast and Elitist Multiobjective Genetic Algorithm: NSGA-II." IEEE Transactions on Evolutionary Computation, vol. 6, No. 2, 2002, pp. 182-197.

* cited by examiner ns, an end having a second circumferential mating surface. The clamp is configured to secure the first circumferential mating surface to the second circumferential mating surface.

CRANKSHAFT ASSEMBLY

CROSS-REFERENCE TO RELATED APPLICATION

The present application is based on and claims the benefit of U.S. provisional patent application Ser. No. 61/982,422, filed Apr. 22, 2014, the content of which is hereby incorporated by reference in its entirety.

This invention was made with government support under 1038294 awarded by the National Science Foundation. The government has certain rights in the invention.

BACKGROUND

Crankshafts are generally cast components that accommodate the required number of throws depending on the number of cylinders in the engine or compressor. In large compressor applications, a breakdown can be very expensive for the operator in the form of lost production or other process outage until repairs can be made, for instance. When the repair involves a crankshaft, the downtime can be lengthy because vendors seldom maintain an inventory of replacement crankshafts. Instead, when a replacement crankshaft is desired, it is manufactured from scratch, which can lead to delays and undesired downtimes.

SUMMARY

Embodiments of the invention are directed to a crankshaft assembly. In some embodiments, the crankshaft assembly includes a crankshaft member, a crank pin shaft member and a clamp. The crankshaft member includes a first central axis and an end having a first circumferential mating surface. The crank pin shaft member includes a second central axis that is substantially parallel to the first central axis, and an end having a second circumferential mating surface. The clamp is configured to secure the first circumferential mating surface to the second circumferential mating surface.

In some embodiments, the crankshaft assembly includes a crankshaft member, a crank pin shaft member, and a clamp. The crankshaft member has a first central axis and the crank pin shaft member has a second central axis that is substantially parallel to the first central axis. The clamp extends substantially perpendicularly to the first and second axes and joins an end of the crankshaft member to an end of the crank pin shaft member. In some embodiments, the claim includes a spacer clamp member, a first clamp member and a second clamp member. The spacer clamp member is positioned between the end of the crankshaft member and the end of the crank pin shaft member. The first clamp member is configured to pinch the end of the crankshaft member against the spacer clamp member. The second clamp member is configured to pinch the end of the crank pin shaft member against the spacer clamp member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
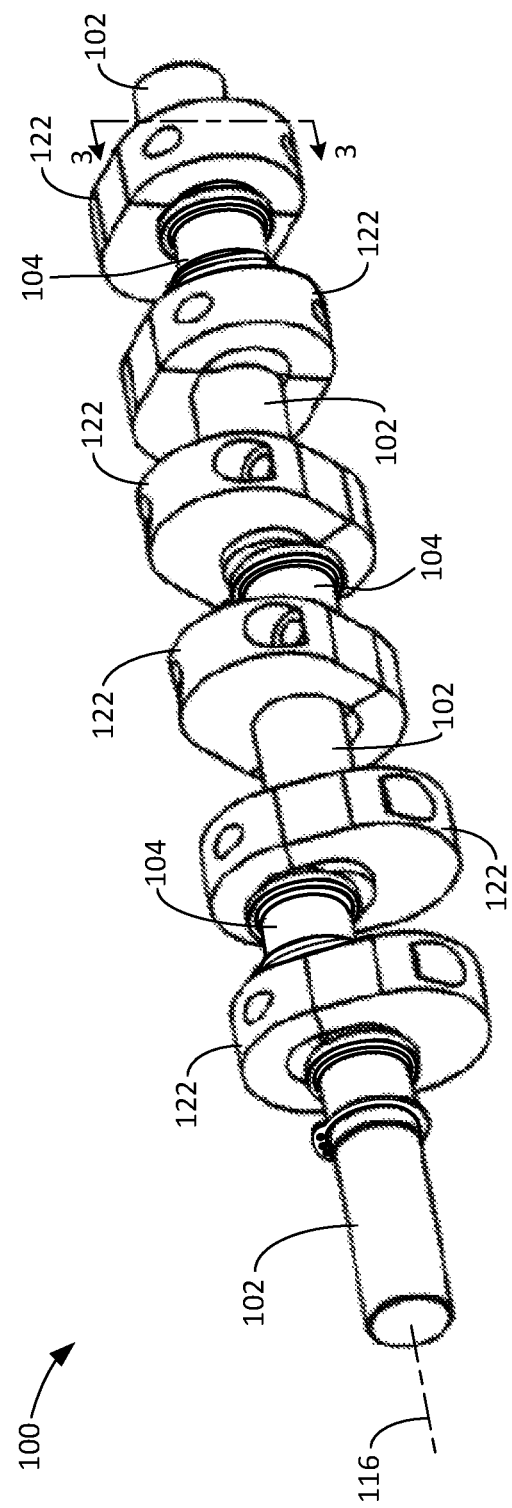
FIGS. 1 and 2 respectively show assembled and exploded isometric views of a crankshaft assembly in accordance with embodiments of the present invention.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
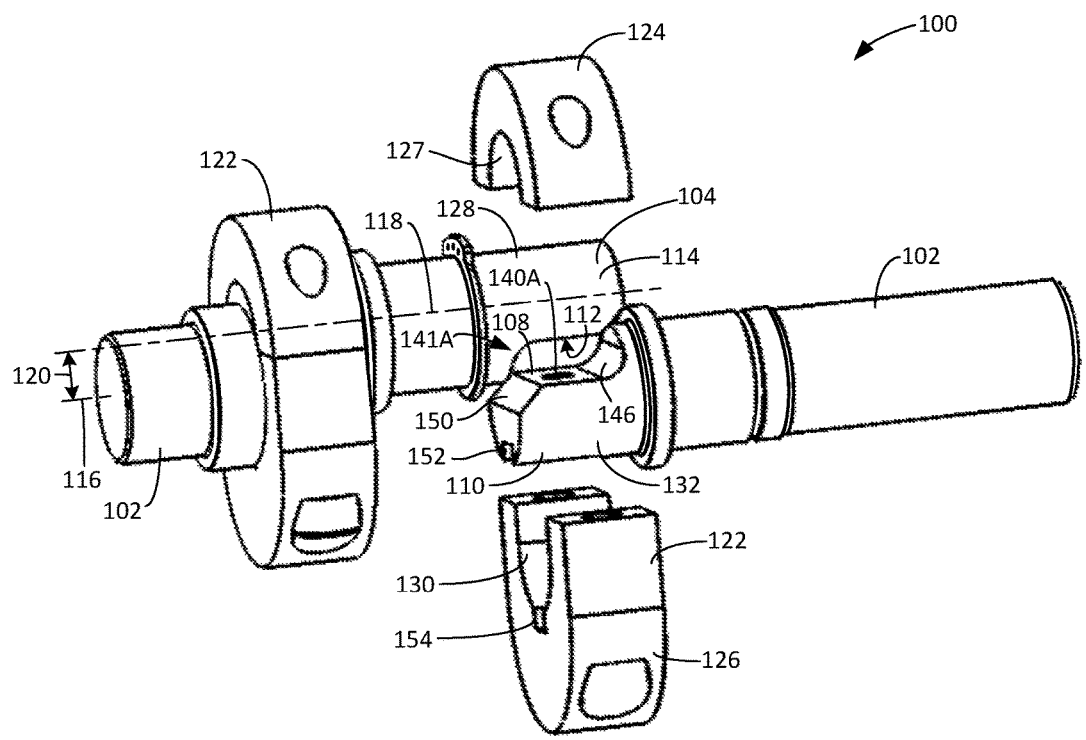

FIGS. 1 and 2 respectively show assembled and exploded views of a crankshaft assembly 100 in accordance with embodiments of the present invention. In some embodiments, the crankshaft assembly 100 includes one or more crankshaft members 102 and one or more crank pin shaft members 104.

The crankshaft member 102 includes a central axis 116 and the crank pin shaft member 104 includes a central axis 118, which is substantially parallel to the axis 116, as shown in FIG. 2. The axes 116 and 118 are offset from each other by a throw distance 120. In some embodiments, the axes 116 and 118 are parallel to each other.

In some embodiments, the crankshaft member 102 includes a circumferential mating surface 108 (FIG. 2) at an end 110. In some embodiments, the crank pin shaft member 104 includes a circumferential mating surface 112 (FIG. 2) at an end 114 that conforms to the mating surface 108. In some embodiments, the mating surfaces 108 and 112 are flat.

Each crank pin shaft member 104 is coupled to at least one crankshaft member 102 using a clamp 122, such as a split shaft collar-type clamp, for example. The clamp 122 presses the mating surfaces 108 and 112 together to form a pre-loaded friction joint between the crankshaft member 102 and the crank pin shaft member 104. Torque is transferred between the crankshaft member 102 and the crank pin shaft member 104 through the mating surfaces 108 and 112.

The throw distance 120 is determined based on the distance the mating surfaces 108 and 112 are displaced from the corresponding axes 116 and 118, respectively. The throw distance 120 may be adjusted through an adjustment of the cutout in the end 110 of the crankshaft member 102 that forms the mating surface 108, and/or the cutout in the end 114 that forms the mating surface 112. As a result, the crankshaft assembly 100 may be customized to provide the desired throw distance 120 using different cutouts at the ends 110 and 114.

In some embodiments, the clamp 122 includes a clamp member 124 and a clamp member 126. The clamp members 124 and 126 are positioned such that when they are joined together they apply a compressive force that is preferably substantially perpendicular (e.g., +/−) 1° to the mating surfaces 108 and 112. In some embodiments, the clamp member 124 includes an inner collar surface 127 that conforms to the exterior surface 128 of the end 114 of the crank pin shaft member 104 that is opposite the mating surface 112. Likewise, in some embodiments, the clamping member 126 includes an interior surface 130 that conforms to an exterior surface 132 of the end 110 of the crankshaft member 102 that is opposite the mating surface 108. In some embodiments, the clamping members 124 and 126 are joined together in accordance with conventional techniques, such as using bolts 134, as shown in FIG. 2. The clamping force generated by the joining of the clamping members 124 and 126 together, produces the desired pre-loaded friction joint that is necessary to secure the ends of 110 and 114 of the shafts 102 and 104 together to form the assembly 100.

In some embodiments, the ends 110 and 114 each include cooperating alignment features to ensure proper alignment between the mating surfaces 108 and 112. In some embodiments, these alignment features are conformable features between the mating surfaces 108 and 112, such as, for example, a step cut axially in the mating surfaces. In some embodiments, each of the mating surfaces 108 and 112 includes a bore, groove or channel that is configured to receive a portion of an alignment member such as a pin or key, to ensure proper alignment between the mating surfaces 108 and 112.

Figure 3:
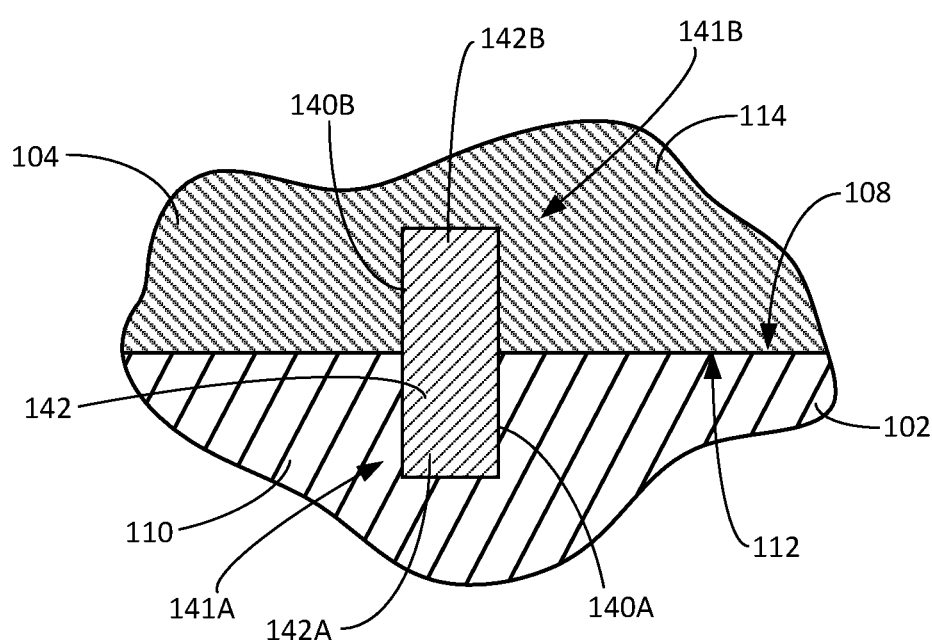
FIG. 3 is a simplified cross-sectional view taken generally along line 3-3 of FIG. 1, illustrating an interface between mating surfaces of a crankshaft and a crank pin shaft that includes an alignment feature in accordance with embodiments of the invention.

FIG. 3 is a sectional view of the interface between the mating surfaces 108 and 112 illustrating exemplary embodiments of the alignment feature. In some embodiments, bores 140A and 140B are respectively formed in the alignment surfaces 108 and 112. The portion of the bore 140A within the end 110 operates as an alignment member receiver 141A that receives a portion 142A of an alignment member 142, such as a pin or dowel. Similarly, the portion of the bore 140B within the end 114 operates as an alignment member receiver 140B that receives a portion 142B of the alignment member 142. Other types of alignment member receivers and alignment members may be used to perform the desired alignment between the mating surfaces 108 and 110. For instance, the alignment member receivers may be in the form of a groove that, when aligned properly, form a keyhole for receiving an alignment member 142.

During assembly of the crankshaft 100, the alignment member 142 is inserted within one of the alignment member receiver 141A of the end 110 or the alignment member receiver 141B of the end 114. The other alignment member receiver 141A or 141B is then fitted over the exposed end of the alignment member 142 to complete the alignment of the faces 108 and 110.

In some embodiments, the cutouts in the ends 110 and 114 each include a radiused portion 146. The radiused portion 146 is configured to distribute stresses in the corresponding end. In some embodiments, a portion of the end 110 and/or the end 114 on the terminating side of the faces 108 and 112 is removed to ensure that the radiused portion 146 of each of the ends 110 and 114 do not contact the other end. In some embodiments, the ends 110 and 114 each include a chamfer 150 to ensure that no contact is made with the radiused portion 146 of the other end.

In some embodiments, the clamps 122 include an alignment feature to ensure that the clamping force applied by the clamps 122 is substantially perpendicular to the mating surfaces 108 and 112. In some embodiments, the alignment feature includes a bore, groove or channel, such as channel 152 formed on the side of the end 110 that is opposite the mating surface 108, and a cooperating bore, channel or groove 154 formed in the clamping member 126, as shown in FIG. 2. The cooperating features 152 and 154 may be aligned through the insertion of a portion of an alignment member in the feature 152, and a portion of the alignment member in the feature 154, in the manner described above with regard to the alignment feature between the mating surfaces 108 and 112. In some embodiments, the clamping alignment feature is only provided on one of the clamping members 126 or 124. In some embodiments, each of the clamping members 126 and 124 include the clamping alignment feature.

In some embodiments, the clamps 122 operate as a counter-mass of the crankshaft assembly 100. In some embodiments, the counter-mass provided by the clamps 122 is adjustable through the use of replaceable metal lugs, through the selection of the clamp members 124 and 126, or through another suitable technique. This allows the crankshaft assembly 100 to be quickly modified as necessary to suit the application for which it is intended.

Figure 4:
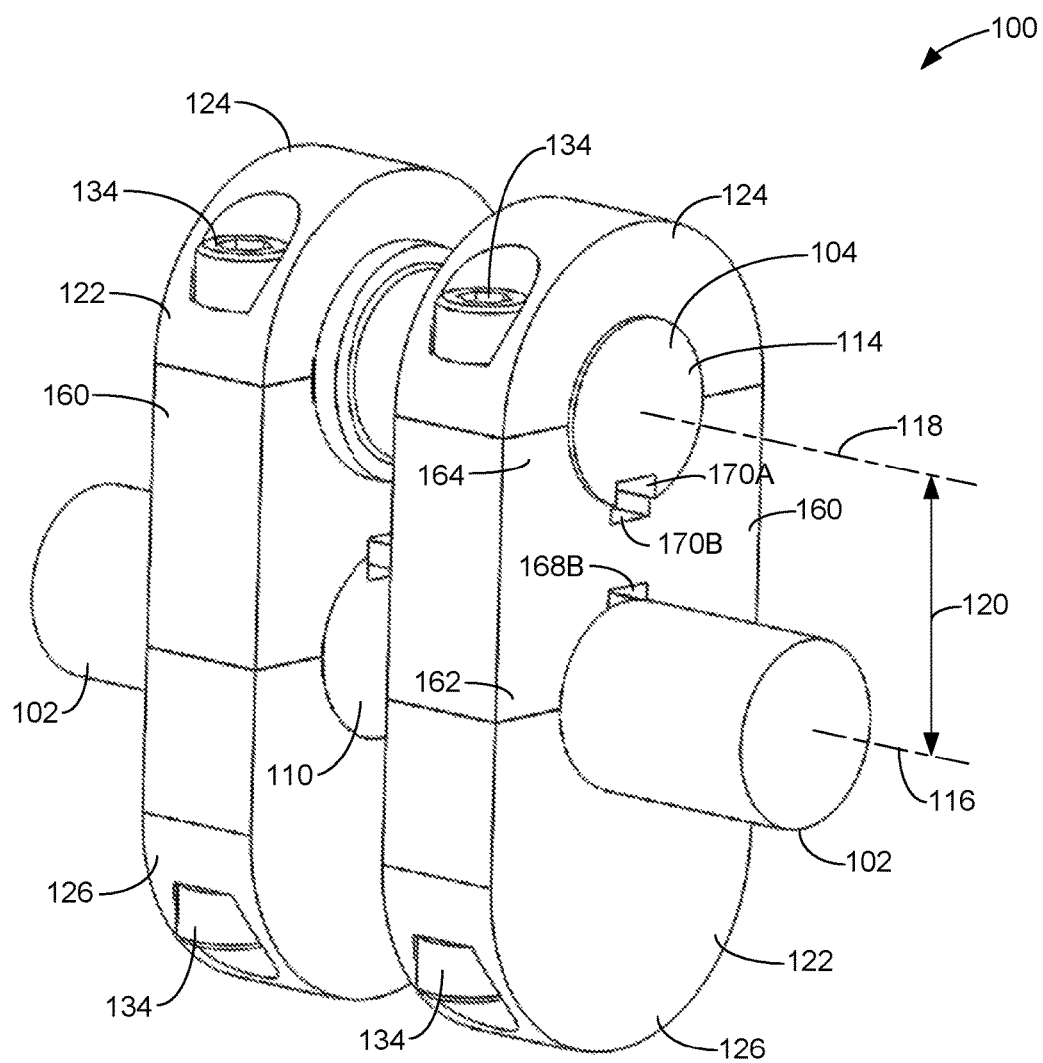
FIGS. 4 and 5 respectively show assembled and exploded isometric views of a portion of a crankshaft assembly in accordance with embodiments of the invention.
Figure 5:
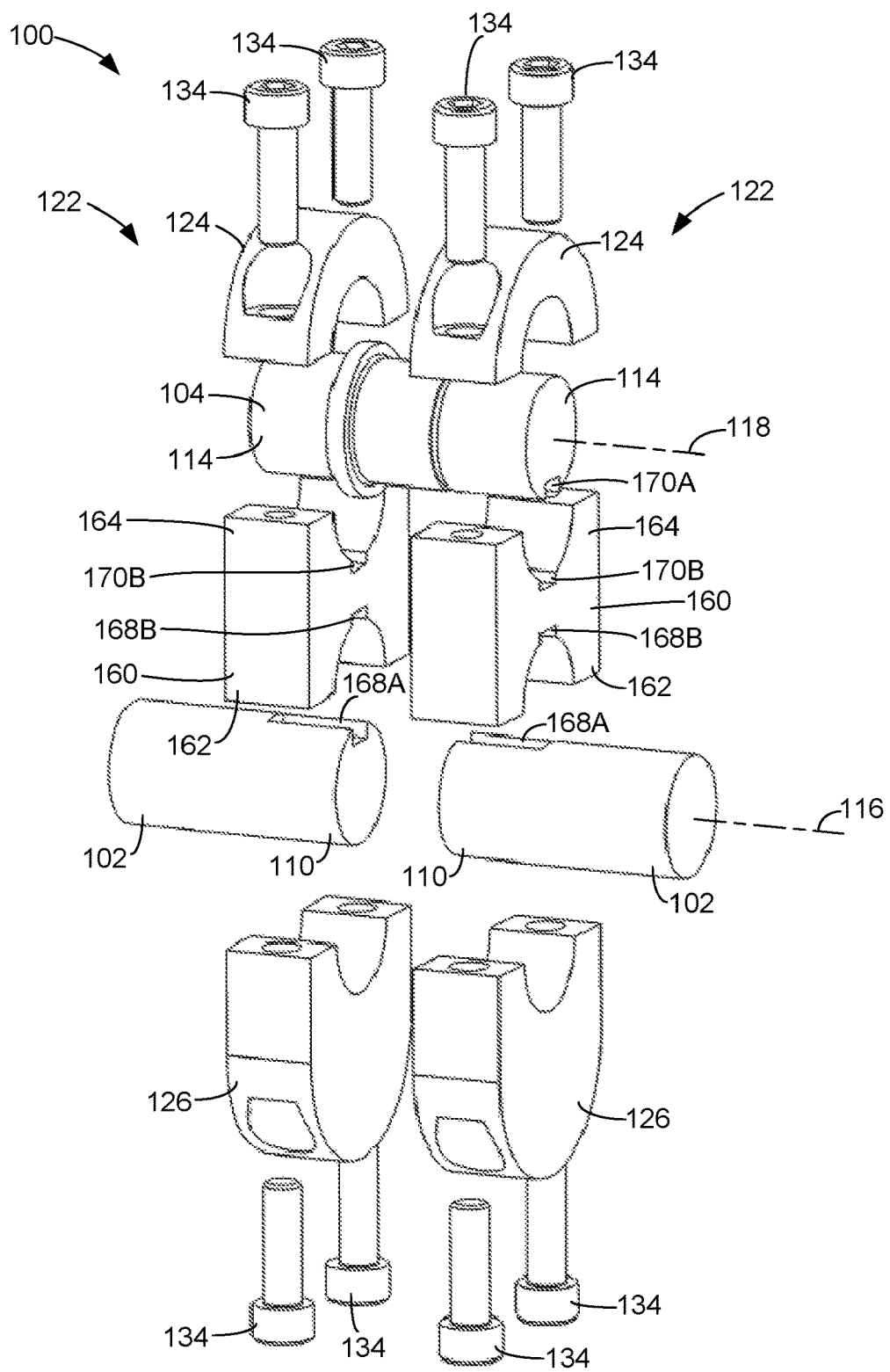

FIGS. 4 and 5 respectively show assembled and exploded views of a portion of a crankshaft assembly 100 in accordance with embodiments of the invention. Elements identified by the same or similar reference numbers as those used above correspond to the same or similar elements. The embodiments of the crankshaft assembly 100 shown in FIGS. 4 and 5 generally illustrate an alternative technique for adjusting the throw distance 120 between the crankshaft member 102 and the crank pin shaft member 204.

In some embodiments, the crankshaft assembly 100 includes a clamp 122 having a spacer clamp member 160 that is positioned between the end 110 of the crankshaft member 102 and the end 114 of the crank pin shaft member 204. The thickness of the spacer clamp member 160 generally determines the throw distance 120 for the crankshaft assembly 100. Thus, the throw distance 120 can be easily adjusted without having to machine the ends 110 and 114 by simply selecting the spacer clamp member 160 having a thickness corresponding to the desired throw distance 120.

In some embodiments, the spacer clamp 160 includes a portion 162 that receives one side of the end 110 of the crankshaft member 102. The other side of the end 110 of the crankshaft member 102 is received by the clamp member 126. Bolts 134 extend through the clamping member 126, and are received by the threaded apertures of the portion 162 of the spacer clamp member 160. The bolts 134 are tightened to secure the end 110 of the crankshaft member 102 between the portion 162 and the clamping member 126. Similarly, the spacer member 160 includes a portion 164 that is configured to receive one side of the end 114 of the crank pin shaft member 204, while the other side of the crank pin shaft member 204 is received by the clamping member 124. Bolts 134 that extend through the clamping member 124 are received in threaded apertures of the portion 164 of the spacer clamp 160. The bolts 134 are tightened to secure the end 114 of the crank pin shaft member 204 between the clamping member 124 and the portion 164 of the spacer clamp member 160. In some embodiments, the bolts or threaded fasteners 134 are replaced with longer threaded fasteners that extend through holes in the clamping member 126, through holes in the spacer clamp member 160 and into threaded apertures the of clamping member 124, for example.

In some embodiments, the clamp 122 of FIGS. 4 and 5 includes a clamp alignment feature to ensure that the crank pin shaft member 104 is located at the desired angular position relative to the axis 116 of the crankshaft member 102. In some embodiments, the clamping alignment feature is in accordance with the embodiments described above with reference to FIGS. 1-3, and includes, for example, conforming surface features on the mating surfaces 108 and 112 (e.g., a step cut axially in the mating surfaces), or cooperating alignment member receivers in the mating surfaces 108 and 112 that receive an alignment member. For example, the end 110 and the portion 162 of the spacer clamp 160 may respectively include cooperating alignment member receivers 168A and 168B in the form of bores or grooves 168, which are configured to receive a portion of an alignment member (e.g., a pin, dowel, or key) to ensure that the spacer clamp member 160 extends from the end 110 of the crankshaft member 102 at a desired angular position about the central axis 116 relative to the crankshaft member 102. Similarly, the end 114 of the crank pin shaft member 104 and the portion 164 of the spacer clamp member 160 may respectively include cooperating alignment member receivers 170A and 170B in the form of bores or grooves 170 that are configured to receive a portion of an alignment member to ensure a desired angular orientation of the spacer clamp member 160 about to the central axis 118 relative to the crank pin shaft member 104. These alignment features ensure proper radial alignment between the clamp members 124 and 126, and the spacer clamp member 160.

Some embodiments are directed to a method of assembling the crankshaft assembly 100 formed in accordance with one or more embodiments described above. In some embodiments, left and right crankshaft members 102 are supported in pillow block bearings or other suitable supports, with a gap between the two shaft members 102. A bearing, such as a roller bearing, is slid over the crank pin shaft member 104 through, for example, a connecting rod. When the mating surfaces 108 and 112 of the crankshaft member 102 and the crank pin shaft member 104 include an alignment feature in accordance with one of the embodiments described above, such as the bores 140A and 140B, an alignment member 142 (e.g., a dowel or key) is inserted into one of the bores, as shown in FIG. 3. The mating surfaces 108 and 112 are then brought together such that the alignment member 142 is received within the open bore, as shown in FIG. 3.

When the clamp 122 includes an alignment feature 154 and the end 110 of the crankshaft member 102 and/or the end 112 of the crank pin shaft member 104 include a cooperating alignment feature 152, a suitable alignment member is inserted into one of the features 152 and 154, and the clamp 122 is placed over the ends 110 and 112 such that the alignment member is received in the other of the features 152 and 154. The bolts 134 of the clamp 122 are then alternately gradually tightened to a torque specification. This locks the crankshaft member 102 to the crank pin shaft member 104. Additional crankshaft and crank pin shaft members may be added to the assembly in a similar manner.

Embodiments of the crankshaft assembly 100 described herein allow for the use of roller bearings for the crankshaft and crank pin for increased efficiency as well as to make it easier to assemble the mechanism. The crankshaft assembly 100 can be assembled inside of the motor enclosure and easily maintained. Additionally, a desired throw distance 120 can be customized using cheap manufacturing techniques.

Embodiments of the crankshaft assembly 100 also allow for the reuse of many components for changing designs. For example, the counter-mass of the clamp may be easily adjusted to accommodate a change in the material of the piston or connecting rod thereby avoiding a redesign of the entire crankshaft. As a result, the crankshaft assembly 100 may be easily modified resulting in reduced manufacturing and tooling costs.

Although the present invention has been described with reference to preferred embodiments, workers skilled in the art will recognize that changes may be made in form and detail without departing from the spirit and scope of the invention.

What is claimed is:
1. A crankshaft assembly comprising:
 a crankshaft member including a first central axis and an end having a first circumferential mating surface;
 a crank pin shaft member including a second central axis that is substantially parallel to the first central axis, and an end having a second circumferential mating surface;
 a clamp configured to secure the first circumferential mating surface to the second circumferential mating surface, the clamp comprising first and second clamp members surrounding the ends of the crankshaft and crank pin members, and extending perpendicularly to the first and second central axes;
 a first alignment member receiver within the first circumferential mating surface of the crankshaft member comprising a first bore having an open end and a closed end that is opposite the open end;
 a second alignment member receiver within the second circumferential mating surface of the crank pin shaft member comprising a second bore having an open end and a closed end that is opposite the open end; and an alignment member having a first portion within the first alignment receiver, and a second portion within the second alignment member receiver;

wherein:
the alignment member aligns the first circumferential mating surface to the second circumferential mating surface; and
the first and second circumferential mating surfaces each include a flat portion.

2. The crankshaft assembly according to claim 1, wherein the first and second circumferential mating surfaces conform to each other.

3. The crankshaft assembly according to claim 1, wherein the alignment member comprises a pin or a dowel received in the first and second bores.

4. The crankshaft assembly according to claim 3, wherein at least one of the alignment member receivers includes a groove or keyway.

5. The crankshaft assembly according to claim 1, wherein:
the clamp includes a third alignment member receiver; and
one of the crankshaft member and the crank pin shaft member includes a fourth alignment member receiver;
wherein the third and fourth alignment member receivers facilitate radial alignment between the clamp and one of the crankshaft member and the crank pin shaft member.

6. The crankshaft assembly according to claim 5, wherein the crankshaft member includes the fourth alignment member receiver of the crankshaft member on an opposing side of the first circumferential mating surface.

7. The crankshaft assembly according to claim 5, wherein the crank pin shaft member includes the fourth alignment member receiver of the crankshaft member on an opposing side of the second circumferential mating surface.

8. The crankshaft assembly according to claim 5, wherein at least one of the third and fourth alignment member receivers includes a bore.

9. The crankshaft assembly according to claim 5, wherein at least one of the third and fourth alignment member receivers includes a groove or a keyway.

10. The crankshaft assembly according to claim 1, wherein:
the flat portion of the first circumferential mating surface is parallel to the first central axis;
the flat portion of the second circumferential mating surface is parallel to the second central axis; and
the clamp presses the flat portions of the first and second circumferential mating surfaces together.

11. The crankshaft assembly according to claim 10, wherein the crankshaft member includes a radiused circumferential portion extending from the first circumferential mating surface.

12. The crankshaft assembly according to claim 10, wherein the crank pin shaft member includes a radiused circumferential portion extending from the second circumferential mating surface.

13. The crankshaft assembly according to claim 1, wherein the first and second central axes are displaced from each other by a throw distance.

* * * * *